United States Patent
Ferreira (10) Patent No.: US 11,410,569 B1
(45) Date of Patent: Aug. 9, 2022

(54) METHODS, SYSTEMS, AND MEDIA FOR IDENTIFYING AND SCORING ASSIGNMENT ANSWERS

(71) Applicant: Teacher Synergy LLC, New York, NY (US)

(72) Inventor: Jose Ferreira, Milford, NJ (US)

(73) Assignee: Teacher Synergy LLC, New York, NY (US)

(*) Notice: Subject to any disclaimer, the term of this patent is extended or adjusted under 35 U.S.C. 154(b) by 0 days.

(21) Appl. No.: 16/683,023

(22) Filed: Nov. 13, 2019

Related U.S. Application Data (60) Provisional application No. 62/760,606, filed on Nov. 13, 2018.

(51) Int. Cl.
*G09B 7/02* (2006.01)

(52) U.S. Cl.
CPC ...................... *G09B 7/02* (2013.01)

(58) Field of Classification Search
CPC .................... G09B 7/02; G09B 7/04
See application file for complete search history.

(56) References Cited

U.S. PATENT DOCUMENTS

| | | | | |
|---|---|---|---|---|
| 2002/0123028 A1* | 9/2002 | Knowles | ................. | G09B 7/02 434/324 |
| 2004/0234938 A1* | 11/2004 | Woolf | ..................... | G09B 7/02 434/353 |
| 2005/0154590 A1* | 7/2005 | Coffey | ..................... | G09B 5/04 704/270 |
| 2009/0110270 A1* | 4/2009 | Poor | ........................ | G09B 7/02 382/165 |
| 2010/0159437 A1* | 6/2010 | German | ................. | G06Q 30/02 434/433 |
| 2012/0189999 A1* | 7/2012 | Uthman | ................... | G09B 7/02 434/335 |
| 2015/0161903 A1* | 6/2015 | Colliander | ............... | G09B 7/06 434/350 |
| 2015/0199598 A1* | 7/2015 | Iams | .................. | G06K 17/0032 434/358 |
| 2015/0301711 A1* | 10/2015 | Abumov | ............ | G06K 9/00449 715/753 |
| 2018/0061263 A1* | 3/2018 | Nishihara | ............. | G06F 40/174 |
| 2018/0096619 A1* | 4/2018 | Fuka | ........................ | G09B 7/00 |
| 2018/0218627 A1* | 8/2018 | Smith Lewis | ........... | G09B 7/04 |
| 2018/0285429 A1* | 10/2018 | Lei | ........................... | G09B 5/10 |

* cited by examiner

*Primary Examiner* — Nathan Hillery
(74) *Attorney, Agent, or Firm* — Byrne Poh LLP (57) ABSTRACT

Mechanisms (including systems, methods, and media) for identifying and scoring assignment answers are provided, the mechanisms comprising: receiving a definition of an assignment having a plurality of questions; identifying correct answers to the questions; receiving student answers to the questions for a student; creating equivalent answers to one of the correct answers and the student answers; comparing the equivalent answers to the other of the correct answers and the student answers; and determining a grade on the assignment for the student based on the comparing the equivalent answers to the other of the correct answers and the student answers.

18 Claims, 8 Drawing Sheets

METHODS, SYSTEMS, AND MEDIA FOR IDENTIFYING AND SCORING ASSIGNMENT ANSWERS

CROSS REFERENCE TO RELATED APPLICATION

This application claims the benefit of U.S. Provisional Patent Application No. 62/760,606, filed Nov. 13, 2018, which is hereby incorporated by reference herein in its entirety.

TECHNICAL FIELD

The disclosed subject matter relates to methods, systems, and media for identifying and scoring assignment answers.

BACKGROUND

Classes frequently have many assignments (e.g., homework assignments, worksheets, etc.) and quizzes/tests (e.g., quizzes or tests at the end of particular chapters of a textbook, quizzes or tests at the end of a particular unit or topic, a midterm exam, a final exam, etc.) that each require grading. For many classes, it may be useful for assignments or tests to be graded automatically. For example, automated grading may save a teacher time. As another example, automated grading may allow a student to be provided with instant feedback by indicating questions that were answered correctly or incorrectly. However, automated grading can be difficult, particularly for assignments or tests that include handwritten answers. For example, it can be difficult to detect where on a page a handwritten answer is located, to identify a handwritten answer, and/or to compare a handwritten answer to a correct, teacher-provided answer.

Accordingly, it is desirable to provide new methods, systems, and media for identifying and scoring assignment answers.

SUMMARY

Methods, systems, and media for identifying and scoring assignment answers are provided in some embodiments.

In some embodiments, systems for identifying and scoring assignment answers are provided, the systems comprising: a memory; and a hardware processor couple to the memory and configured to: receive a definition of an assignment having a plurality of questions; identify correct answers to the questions; receive student answers to the questions for a student; create equivalent answers to one of the correct answers and the student answers; compare the equivalent answers to the other of the correct answers and the student answers; and determine a grade on the assignment for the student based on the comparing the equivalent answers to the other of the correct answers and the student answers.

In some embodiments, methods for identifying and scoring assignment answers are provided, the methods comprising: receiving a definition of an assignment having a plurality of questions; identifying correct answers to the questions; receiving student answers to the questions for a student; creating equivalent answers to one of the correct answers and the student answers using a hardware processor; comparing the equivalent answers to the other of the correct answers and the student answers using the hardware processor; and determining a grade on the assignment for the student based on the comparing the equivalent answers to the other of the correct answers and the student answers.

In some embodiments, non-transitory computer-readable media containing computer-executable instructions that, when executed by a processor, cause the processor to perform a method for identifying and scoring assignment answers are provided, the method comprising: receiving a definition of an assignment having a plurality of questions; identifying correct answers to the questions; receiving student answers to the questions for a student; creating equivalent answers to one of the correct answers and the student answers; comparing the equivalent answers to the other of the correct answers and the student answers; and determining a grade on the assignment for the student based on the comparing the equivalent answers to the other of the correct answers and the student answers.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for identifying and scoring assignment answers are provided.

In some embodiments, the mechanisms described herein can receive an assignment from a first user device (e.g., a user device associated with a teacher of a class, and/or any other suitable user device) and can receive a completed assignment from a second user device (e.g., a user device associated with a student in a class). In some embodiments, the mechanisms described herein can identify individual answers in a completed assignment, compare the individual answers (or corrected answers, converted answers, and/or equivalent answers) in the completed assignment submitted by a second user device with answers (or equivalents answers) provided by a first user device, and assign a grade to the completed assignment based on the comparison of the individual answers (or corrected answers, converted answers, and/or equivalent answers) with answers (or equivalents answers) provided by the first user device. Note that, in some embodiments, an assignment received from a user device associated with a teacher of a class and/or a completed assignment received from a user device of a student taking a class can be in any suitable format. For example, in some embodiments, an assignment and/or a completed assignment received by the mechanisms described herein can be an image taken of a hard-copy paper that includes handwritten questions and/or answers, as described in more detail below. In some embodiments, the mechanisms described herein can receive an image of an assignment and/or a completed assignment and can use any suitable image processing techniques and/or handwriting analysis techniques to score a completed assignment.

In some embodiments, an assignment and/or a completed assignment can be in any suitable format. For example, in some embodiments, an assignment and/or a completed assignment can use a template that includes portions for one or more questions and/or portions for answers corresponding to each question. Examples of templates for assignments are shown in and described below in connection with FIGS. 2A-2C. In some such embodiments, an assignment and/or a completed assignment can be submitted to a server that stores an assignment and/or grades a completed assignment in any suitable manner. For example, in some embodiments, a user of a first user device can submit an image of a template of an assignment that has been filled in with questions and/or teacher-provided answers to questions. As another example, in some embodiments, a user of a second user device can submit an image of a completed assignment with answers entered on a template of an assignment. Note that, in some embodiments, the mechanisms described herein can identify portions of an image of an assignment and/or a completed assignment that correspond to a question, a teacher-provided correct answer, and/or a student-provided answer using markings on the template, as described below in connection with FIG. 1. Alternatively, in some embodiments, assignments can be provided by a first user device and/or submitted as a completed assignment by a second user device without using a template. For example, in some embodiments, an assignment and/or a completed assignment can be submitted as an image captured of one or more pages of paper, and the mechanisms described herein can use any suitable image processing techniques to identify questions and/or answers on the page(s).

In some embodiments, the mechanisms described herein can use any suitable technique or combination of techniques for identifying answers in a completed assignment. For example, in some embodiments, the mechanisms can identify portions of an image of a submitted completed assignment that correspond to individual answers prior to identifying an answer written by a student. As a more particular example, in some embodiments, the mechanisms can identify portions of an image of a completed assignment submitted by a second user device (e.g., a user device of a student) based on a corresponding assignment submitted by a first user device (e.g., a user device of a teacher). As a specific example, in an instance where an assignment submitted by a first user device is known to have five questions (e.g., based on a template used for the assignment, based on image processing techniques used to identify five questions, and/or based on any other suitable information), the mechanisms can identify five portions of the image of the completed assignment likely to correspond to answers.

In some embodiments, the mechanisms can identify individual answers of a completed assignment using any suitable technique or combination of techniques. For example, in some embodiments, the mechanisms can use any suitable handwriting recognition techniques to identify individual answers of a completed assignment. As yet another example, in some embodiments, the mechanisms can perform any suitable verification, correction, or conversion of an identified answer. As a more particular example, in instances where an answer includes a word, the mechanisms can correct a spelling of an identified word prior to verifying an accuracy of the answer. As another more particular example, in instances where an answer includes an algebraic expression, the mechanisms can convert an identified algebraic expression to an equivalent algebraic expression. As a specific example, in some embodiments, the mechanisms can convert an expression such as "(x+2)(x−2)" to an equivalent expression such as "(x−2)(x+2)" using any suitable mathematical properties, such as the commutative property, the distributive property, and/or any other suitable property.

In some embodiments, the mechanisms described herein can be used to automatically grade completed assignments, completed quizzes, completed tests, and/or any other suitable content that includes handwritten answers. For example, in some embodiments, the mechanisms can receive an image of a completed assignment, quiz, and/or test that includes handwritten answers. As a more particular example, in some embodiments, the mechanisms can receive an image captured by a camera of a user device associated with a student of a class, where the image is of a hard-copy paper version of the assignment, quiz, and/or test that has been completed by hand (e.g., that has handwritten answers, that was not completed on a computer, and/or completed in any other suitable manner). In some such embodiments, the mechanisms can detect portions of a received image that include answers, can identify a handwritten answer, and can compare an identified handwritten answer provided by a student of a class to a correct, teacher-provided answer. By applying the techniques described herein, the mechanisms can therefore be used for automatic grading of assignments, quizzes, and/or tests that have been completed on hard-copy paper and that include handwritten answers.

Note that, although the mechanisms described herein generally relate to identifying questions and answers associated with assignments, in some embodiments, the techniques described herein can be used to identify questions and/or answers of quizzes, tests, and/or any other suitable type of content.

Figure 1:
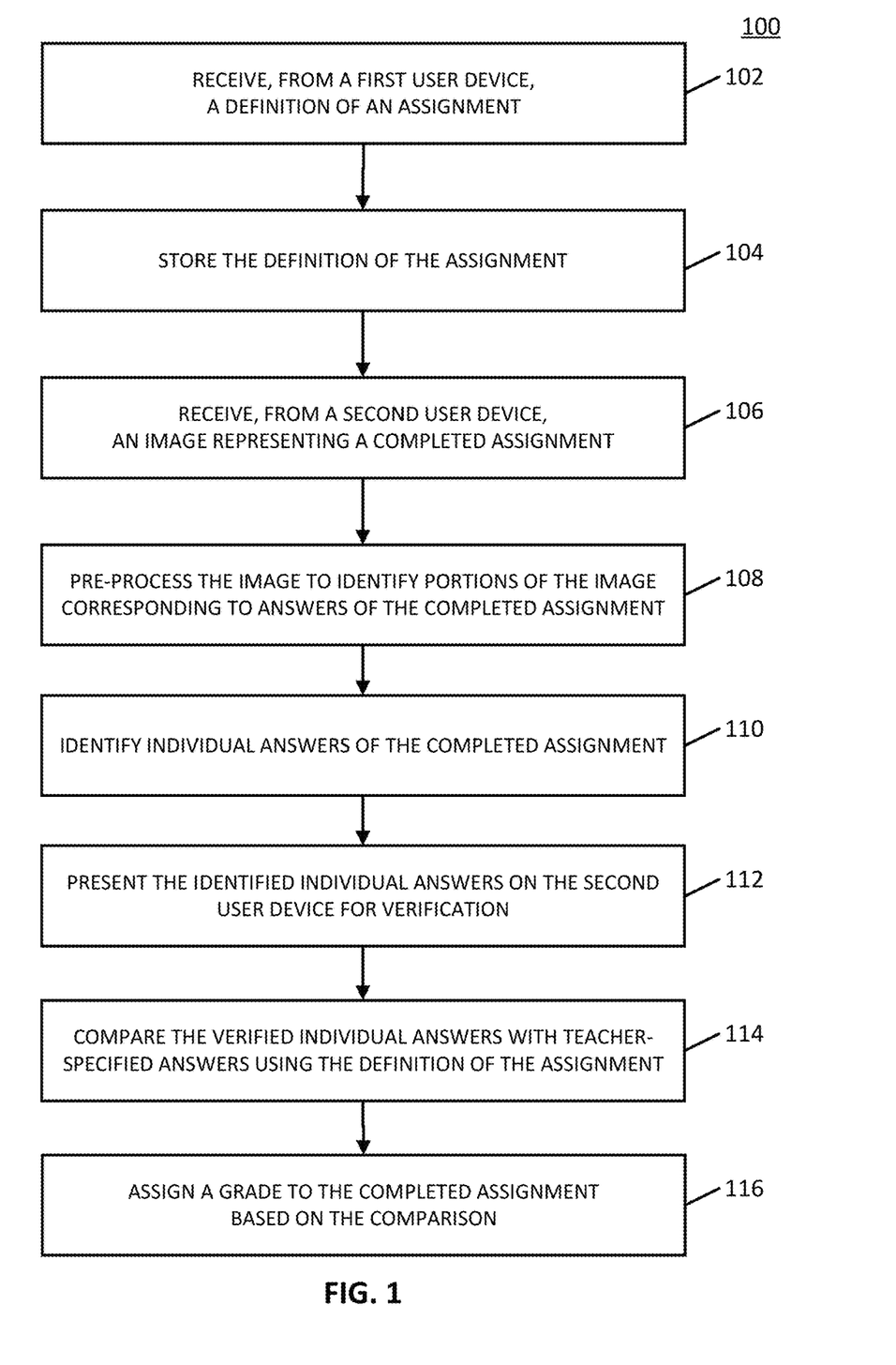
FIG. 1 shows an example of a process for identifying and scoring assignment answers in accordance with some embodiments of the disclosed subject matter.

Turning to FIG. 1, an example 100 of a process for identifying and scoring assignment answers is shown in accordance with some embodiments of the disclosed subject matter. In some embodiments, process 100 can be executed by any suitable device, such as a server that stores assignments (e.g., from one or more teachers) and/or that receives completed assignments (e.g., from one or more students), and/or by any other suitable device.

Process 100 can begin at 102 by receiving, from a first user device, a definition of an assignment. In some embodiments, the first user device can correspond to any suitable user, such as a teacher, and/or any other suitable user. In some embodiments, the first user device can be any suitable type of user device, such as a mobile phone, a tablet computer, a laptop computer, a desktop computer, and/or any other suitable type of user device. Note that, in some embodiments, a definition of an assignment can include questions and teacher-provided answers to each question. In some embodiments, a definition of an assignment can include any suitable number of documents or images. For example, in some embodiments, a definition of an assignment can include one document or image with questions and corresponding answers on the same image or page. As another example, in some embodiments, a definition of an assignment can include a first document or image that includes questions and a second document or image that includes answers to questions included in the first document or image.

In some embodiments, the definition of the assignment can include any other suitable information that can be used by process 100 to process received completed assignments (e.g., received from students of a class), as described below in connection with 108 and 110. For example, in some embodiments, the definition of the assignment can include a number of questions included in the assignment. As another example, in some embodiments the definition of the assignment can include a type of answer corresponding to each question (e.g., that question 1 is a multiple-choice question, that questions 2-5 are free response questions, and/or any other suitable type of answers). Note that, in some embodiments, a type of answer can include an indication of a format of an answer, such as that question 1 is to be a numeric answer, question 2 is to be a single letter answer (e.g. a letter from A-D for a multiple choice question, and/or any other single letter), question 3 is to be a short free response (e.g., "5 cookies," and/or any other suitable free response), question 4 is to be an algebraic expression (e.g., "(x+2)(x−2)," and/or any other suitable algebraic expression), and/or any other suitable format.

Figure 2A:
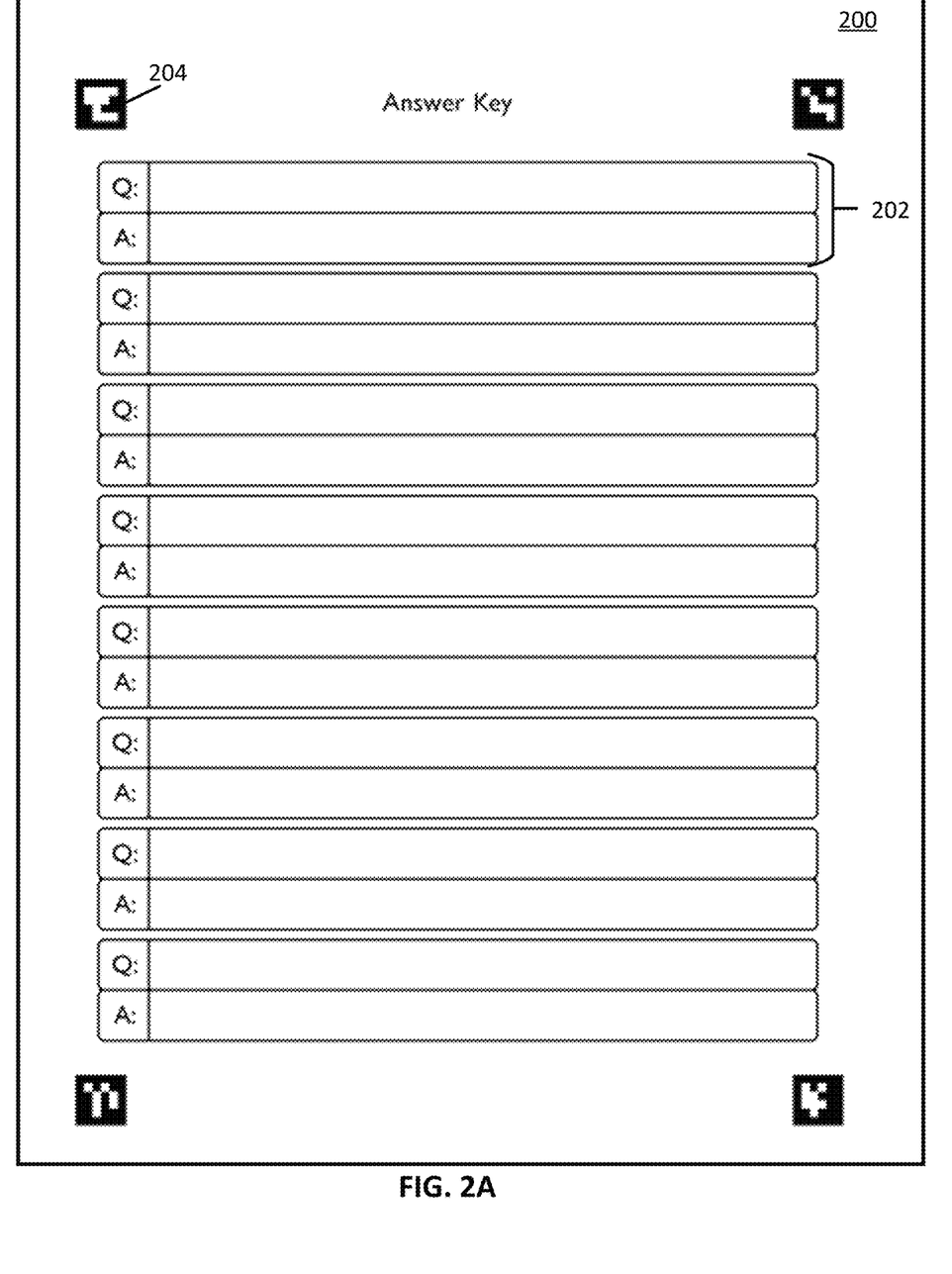
FIGS. 2A-2C show example user interfaces of assignment templates in accordance with some embodiments of the disclosed subject matter.
Figure 2B:
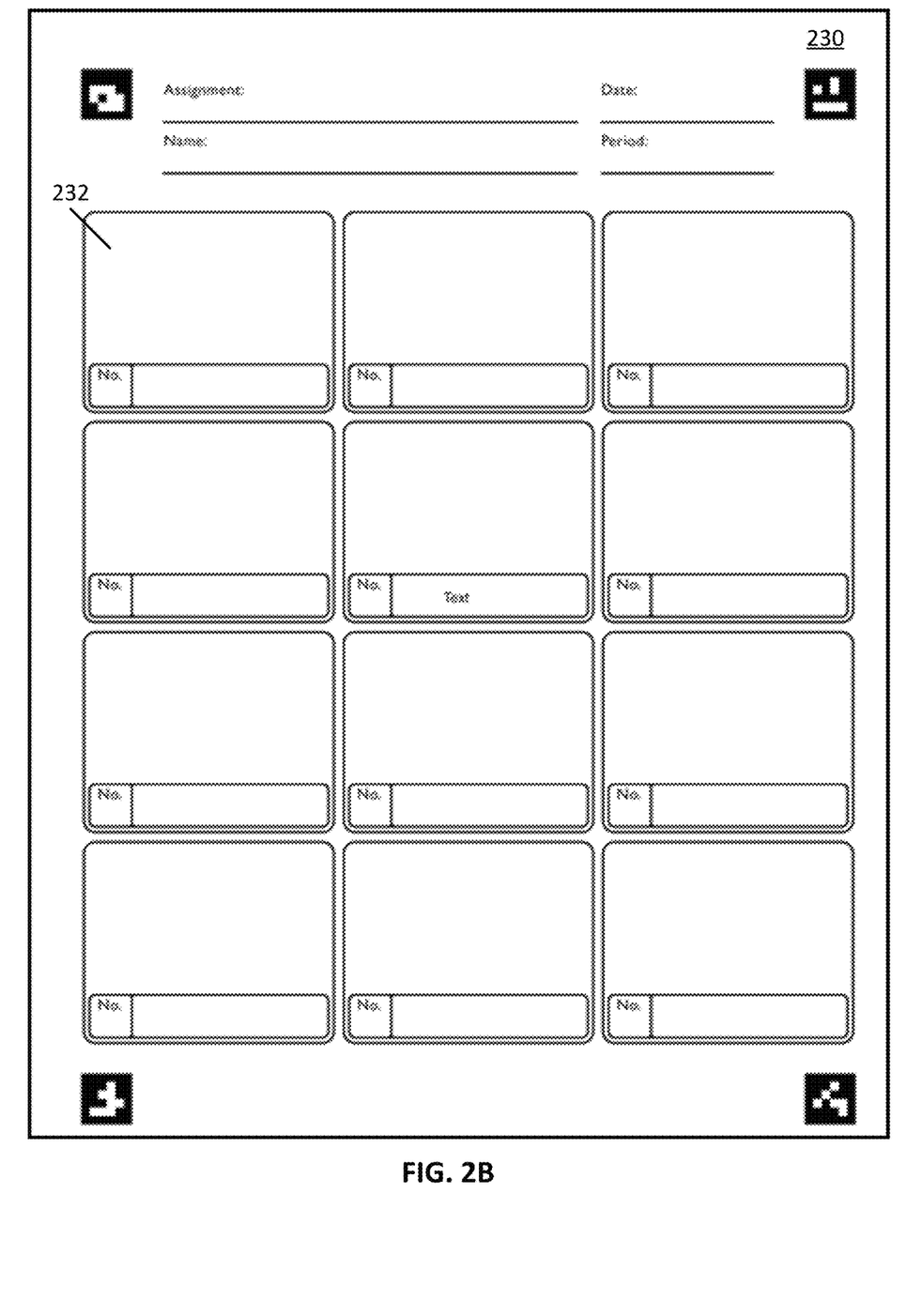
Figure 2C:
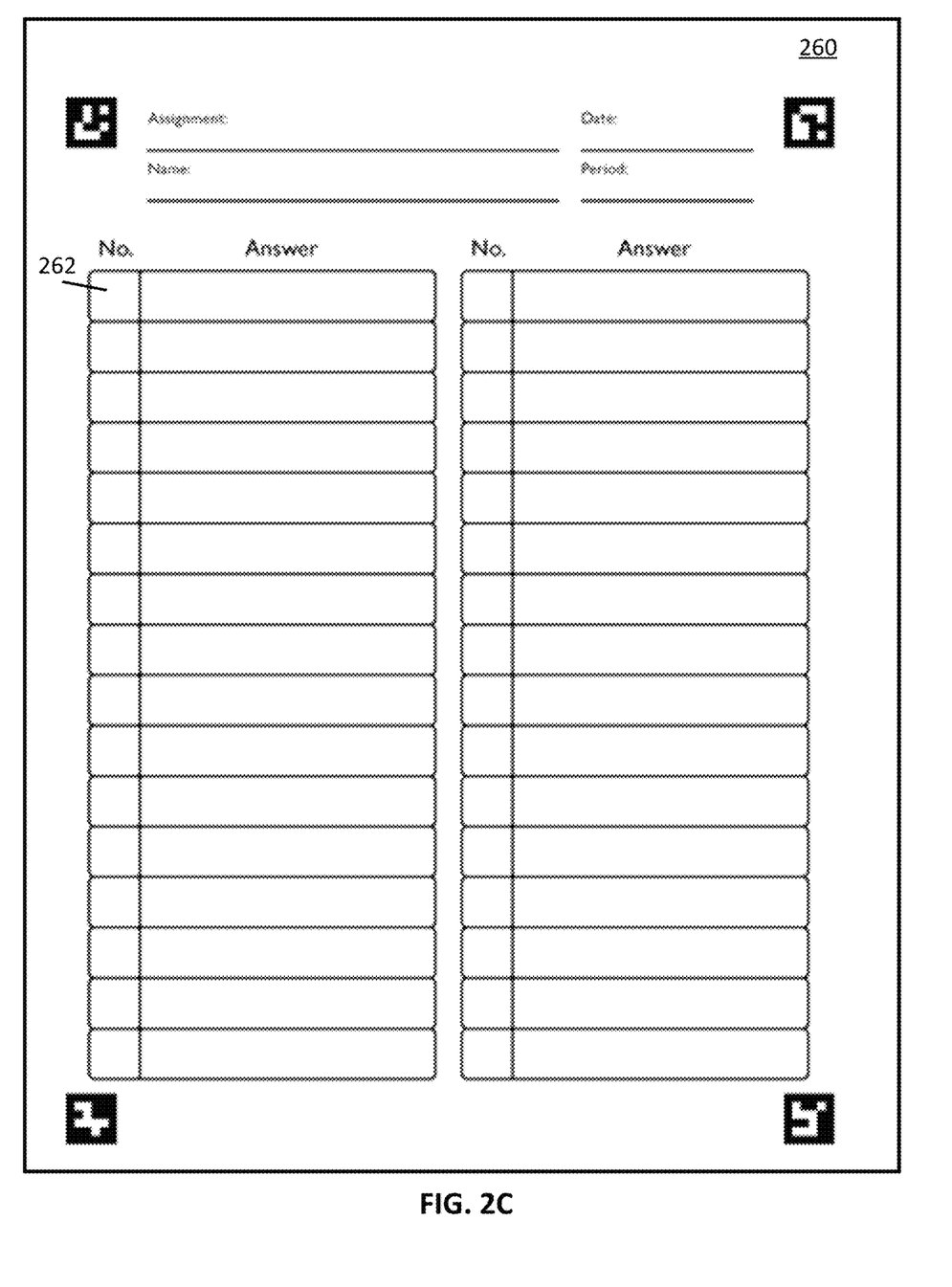
Figure 3A:
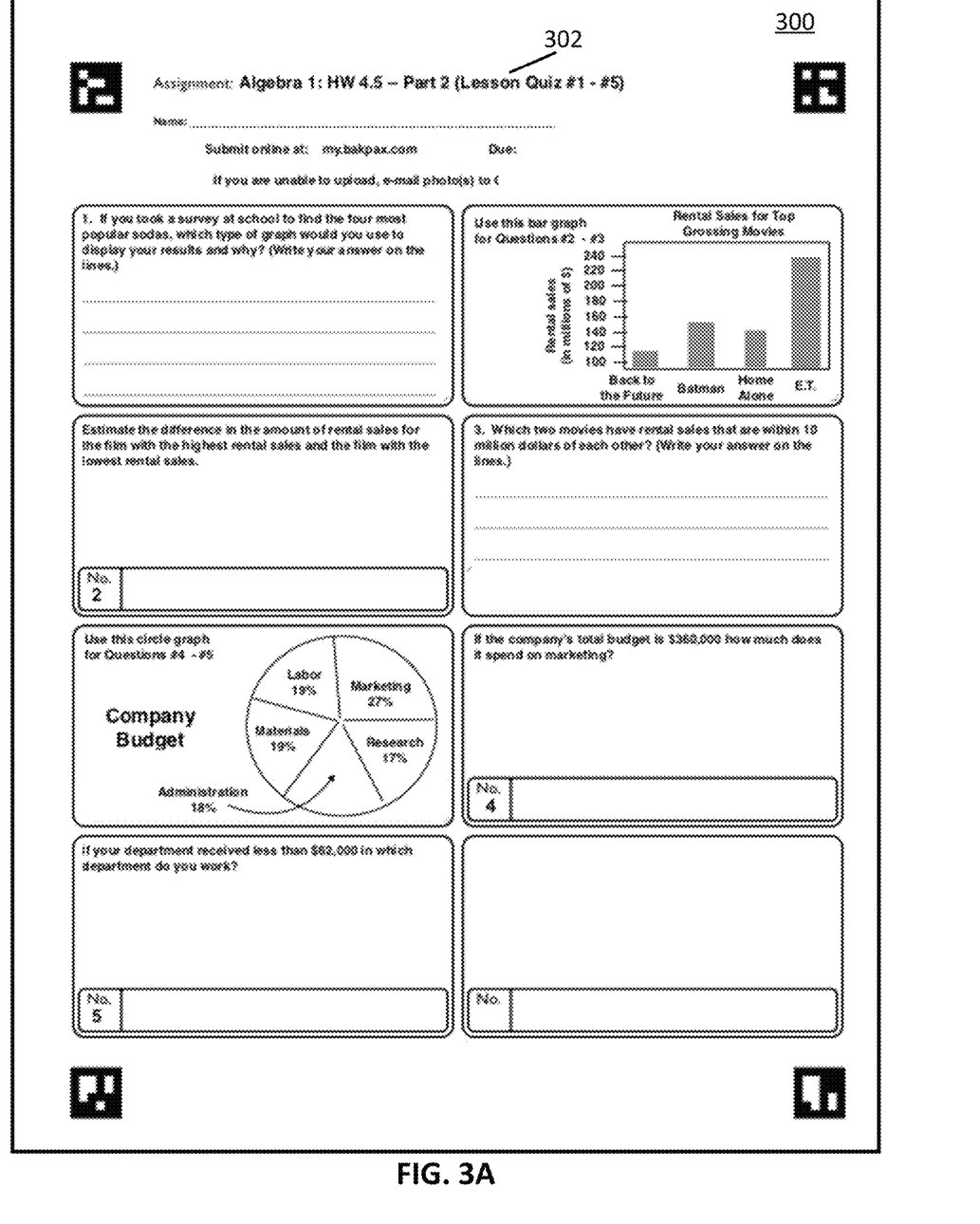
FIGS. 3A and 3B show example user interfaces of assignments in accordance with some embodiments of the disclosed subject matter.

Turning to FIGS. 2A-2C, 3A, and 3B, examples of templates of assignments for indicating questions and/or answers of an assignment are shown in FIGS. 2A-2C, 3A, and 3B. Templates 200, 230, and 260 of FIGS. 2A-2C show examples of blank templates of assignments in accordance with some embodiments of the disclosed subject matter that can be filled in by a teacher (e.g., a user of the first user device) and/or by a student (e.g., a user of a second user device as described below in connection with 106). In some embodiments, as shown in FIG. 2A, template 200 can include a portion 202 for indicating both a question and an answer. In some embodiments, as shown in FIGS. 2B and 3A, a template can include a portion 232 for providing a longer question and/or information that can be used for multiple questions. For example, as shown in template 300 of FIG. 3A, in some embodiments, information (such as a graph, a portion of text, and/or any other suitable information) can be provided which can be referred to by multiple questions. Note that, in some embodiments, answers to questions can be provided in a separate document and/or a separate template. For example, as shown in template 260 of FIG. 2C, in some embodiments, a template can include an answer key with one or more portions 262 for answers to questions provided using a different template. Note that, in some embodiments, one or more templates of assignments can be provided by any suitable entity, such as an entity associated with process 100 (e.g., a business or company associated with automated grading of assignments, and/or any other suitable entity).

Note that, in some embodiments, a template of an assignment can include any other suitable information. For example, as shown in FIGS. 2A-2C and 3A, a template of an assignment can include any suitable marking 204 (e.g., an ArUco marking, a hash, and/or any other suitable marking) that can be used for de-skewing an image of an assignment and/or for performing any other suitable processing on an image of a template of an assignment and/or on an image of a completed assignment. As another example, as shown in FIG. 3A, a template of an assignment can include an assignment indicator 302 that can indicate any suitable information (e.g., a name of a course or class associated with the assignment, a date associated with the assignment, and/or any other suitable information).

In some embodiments, the definition of the assignment can be received in any suitable manner. For example, in some embodiments, the first user device can transmit an image of a template of an assignment that has been filled in, such as an image of template 300 of FIG. 3A. In some such embodiments, the image can be transmitted to, for example, a server executing process 100. As another example, in some embodiments, a user of the first user device can fill in a template using a user interface (not shown) provided by a server executing process 100. In some such embodiments, questions and/or answers can be entered into and/or arranged in the template using a touchscreen of the first user device, a keyboard of the first user device, a stylus of the first user device, and/or in any other suitable manner.

Figure 3B:
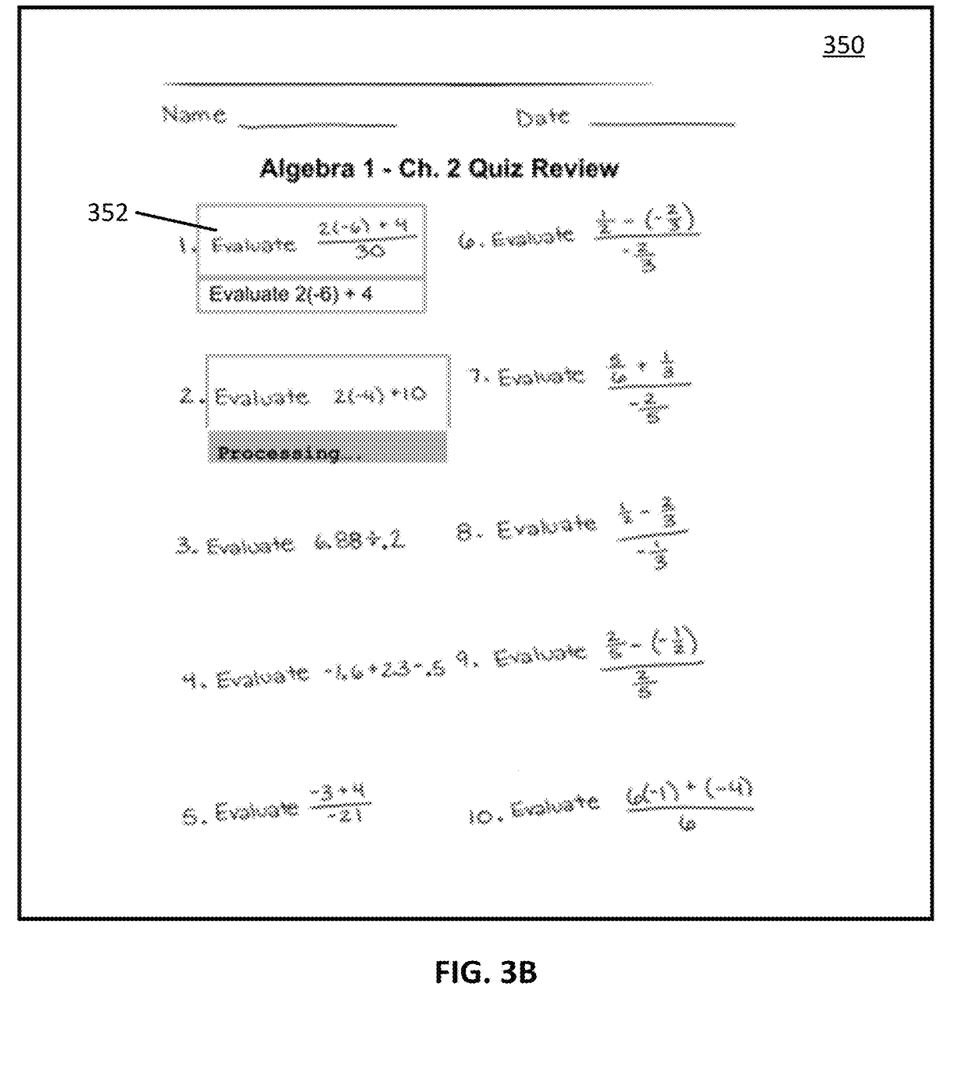

Note that, in some embodiments, an assignment may not be associated with a template. For example, in some embodiments, a user of the first user device can submit an image of a handwritten assignment, as shown in FIG. 3B. Turning to FIG. 3B, an image 350 that can correspond to an image of an assignment is shown in accordance with some embodiments of the disclosed subject matter. As illustrated, image 350 can include one or more questions 352. In some embodiments, in response to receiving the image of the assignment, process 100 can detect questions and/or question and answer pairs in any suitable manner. For example, in some embodiments, a user of the first user device can mark questions, answers, and/or questions and answer pairs in any suitable manner. As a more particular example, in some embodiments, each question and answer pair can be marked with a box or rectangle. As another more particular example, in some embodiments, each question can be marked with a box and each answer can be marked with a circle. Note that markings are given herein merely as examples, and any suitable markings can be used in some embodiments. As another example, in some embodiments, process 100 can detect questions, answers, and/or question and answer pairs by detecting blank space and segmenting portions of a received image into questions, answers, and/or question and answer pairs based on the detected blank space.

Referring back to FIG. 1, at 104, process 100 can store the definition of the assignment. In some embodiments, process 100 can store the definition of the assignment in any suitable manner. For example, in some embodiments, process 100 can store the definition of the assignment in connection with an indicator of a class associated with the assignment (e.g., "Algebra 1," "Math 302," and/or any other suitable class indication), a name of a teacher, an identifier of a particular assignment (e.g., "Chapter 1 Quiz," "factoring polynomials," and/or any other suitable identifier), and/or in connection with any other suitable indicator or information.

At 106, process 100 can receive, from a second user device, an image representing a completed assignment. Note that, in some embodiments, the second user device can correspond to a student of a particular class. In some embodiments, the image representing the completed assignment can be received in any suitable manner. For example, in some embodiments, the image can be uploaded by the second user device via any suitable user interface (not shown). As a more particular example, in some embodiments, the user interface can allow the second user device to upload the image representing the completed assignment in connection with a particular class, teacher, and/or assignment. As a specific example, in some embodiments, the user interface can include drop-down menus for selecting a particular class, teacher, and/or assignment.

Note that, in some embodiments, the image representing the completed assignment can be in any suitable format. For example, in some embodiments, the completed assignment can use any suitable template, as shown in and described above in connection with FIGS. 2A and 2B. As a more particular example, in some embodiments, the completed assignment can be submitted as an image captured of the template. Note that, in instances where multiple students complete the assignment, each can submit an image of the completed assignment that has a different format. For example, in some embodiments, a first student can complete the assignment using a template as shown in FIG. 2A, and a second student can complete the assignment using a template as shown in FIG. 2B.

Additionally, note that, in some embodiments, answers can be handwritten, typed, and/or provided in any other suitable manner. For example, in some embodiments, answers can be handwritten on a page (e.g., using a pen or pencil), and the image can be a photo of the page that includes handwritten answers. As another example, in some embodiments, the image can be an image that includes handwritten answers written using a stylus of a computer (e.g., a stylus of a mobile phone, tablet computer, laptop computer, and/or any other suitable type of computer). As yet another example, in some embodiments, answers can be typed using a keyboard of the second user device.

At 108, process 100 can pre-process the image to identify portions of the image corresponding to answers of the completed assignment. In some embodiments, process 100 can pre-process the image using any suitable technique or combination of techniques. For example, in some embodiments, process 100 can de-skew the image. As a more particular example, in some embodiments, process 100 can de-skew the image using ArUco markers or other markers located on the image using any suitable image processing technique(s). As a specific example, in some embodiments, process 100 can de-skew the image using algorithms described in S. Garrido-Jurado, R. Muñoz-Salinas, F. J. Madrid-Cuevas, and M. J. Marin-Jiménez. 2014. *"Automatic generation and detection of highly reliable fiducial markers under occlusion". Pattern Recogn.* 47, 6 (June 2014), 2280-2292, which is hereby incorporated by reference herein in its entirety.

As another example, in some embodiments, process 100 can identify portions of the image corresponding to answers of the completed assignment by mapping the image to the definition of the assignment received from the first user device as described above in connection with 102. As a more particular example, in some embodiments, process 100 can map the image to the definition of the assignment based on a number of questions in the assignment. As a specific example, in an instance where the definition of the assignment indicates that there are five questions in the assignment, process 100 can identify five portions of the image each corresponding to one answer of five answers.

Note that, in instances where the completed assignment is completed using a particular template, process 100 can identify portions of the image corresponding to answers using markings on the template. For example, in an instance where the template shown in FIG. 2C is used to submit the completed assignment, process 100 can identify content in portion 262 as an individual answer. As a more particular example, in instances where a template is used to submit a completed assignment, process 100 can identify boxes on the image that are likely to contain answers and/or lines that mark areas to enter answers. Alternatively, in instances where no template is used for a completed assignment, process 100 can detect portions of the image corresponding to individual answers using any suitable image recognition techniques. For example, in instances where individual answers are marked by a student in any suitable manner (e.g., using boxes, circles, and/or any other suitable marking), process 100 can detect the markings. As another example, in some embodiments, process 100 can detect blank spaces around portions of the image and can identify portions of the image likely to correspond to answers based on the detected blank spaces, as described above in more detail in connection with 102.

At 110, process 100 can identify individual answers of the completed assignment. In some embodiments, process 100 can identify the individual answers using any suitable handwriting recognition technique(s). For example, in some embodiments, process 100 can use any suitable handwriting recognition technique(s) to identify any suitable handwritten numbers, letters, words, icons, symbols, and/or any other suitable content. In some embodiments, process 100 can identify individual characters and can then identify an answer based on the identified characters. For example, in some embodiments, process 100 can identify a series of numbers, such as "5," "6," and "0," and can identify a corresponding answer as "560." As another example, in some embodiments, process 100 can identify a series of letters, and can identify a corresponding answer as a word corresponding to the series of letters. Note that, in some embodiments, an identified answer can be any suitable combination of letters, numbers, and/or any other suitable symbols or characters. For example, an identified answer can include an algebraic expression (e.g., "5x+2," "(x+2)(x−2)," and/or any other suitable expression), a combination of numbers and words (e.g., "5 cookies," and/or any other suitable combination), any suitable symbols (e.g., arithmetic operators, measurement units, and/or any other suitable symbols), and/or any other suitable content.

Note that, in some embodiments, process 100 can perform any suitable automated verification or processing of an identified answer. For example, in some embodiments, process 100 can perform automated verification or processing of an identified answer based on a definition of an assignment, as described above in connection with 102. As a more particular example, in an instance where the definition of an assignment indicates that an answer to a particular question is to be a word, process 100 can perform any suitable spell-checking on an identified answer. As a specific example, in an instance where an identified answer is "5 cookies," process 100 can determine that the identified answer is to be corrected to "5 cookies" prior to comparing the identified answer to a teacher-specified answer, as described below in connection with 114. As another more particular example, in an instance where the definition of an assignment indicates that an answer to a particular question is to have a numeric answer, and in an instance where an identified answer and/or a portion of an identified answer appears to include a letter, process 100 can determine if the identified letter is likely to be a particular number. As a specific example, in an instance where an "S" is detected in an identified answer that is to have a numeric format, process 100 can determine that "S" is likely to be a "5." Note that, in some embodiments, process 100 can use any suitable stored dictionaries, tables, lists, etc. to perform automated processing of an answer.

As another example, in some embodiments, process 100 can normalize an identified answer to have a particular format. For example, in an instance where a type of answer to a particular question as indicated in the definition of the assignment received at 102 is an algebraic expression, process 100 can convert an identified answer into an equivalent algebraic expression prior to comparison with a teacher-specified answer at 114. As a more particular example, in some embodiments, process 100 can convert an identified answer including an algebraic expression to an equivalent answer using any suitable mathematical rules or properties, such as the commutative property, the distributive property, and/or any other suitable rules. As a specific example, in some embodiments, process 100 can convert an algebraic expression such as "$(x+2)(x-2)$" to "$(x-2)(x+2)$." As another specific example, in some embodiments, process 100 can convert an algebraic expression such as "$5x=3y$" to "$x=(3y)/5$." Note that, in instances where process 100 converts an identified answer to an equivalent answer, process 100 can convert the identified answer based on information associated with the assignment. For example, in an instance where the definition of the assignment indicates that a particular answer is to include a factored polynomial, process 100 can convert an answer such as "$(x+2)(x-2)$" to "$(x-2)(x+2)$," and process 100 cannot convert the answer to "$x^2-4$."

As yet another example, in some embodiments, process 100 can normalize an identified answer to use particular notation. As a more particular example, in some embodiments, in an instance where a user has written a multiplication operator as "x," process 100 can normalize an identified answer to use "*," and/or any other suitable equivalent notation. As another more particular example, process 100 can normalize an answer that includes a number written in scientific notation to an answer written in non-scientific notation. As yet another more particular example, process 100 can normalize an answer that includes a number written as a fraction to a number written using a decimal.

Note that, in some embodiments, process 100 can perform any suitable automated verification or answer conversion based on the definition of the assignment received at 102. For example, in an instance where an identified answer is not a recognized word, process 100 can identify a word similar to a word provided in an answer key associated with the definition of the assignment of a corresponding question.

At 112, process 100 can present the identified individual answers on the second user device for verification. For example, in some embodiments, process 100 can present a user interface on the second user device that indicates individual answers after any suitable automated verification, spell-checking, and/or answer conversion. As a more particular example, in some embodiments, in an instance where process 100 detected an answer of "5 cookies," and determined at block 110 that a user of the second user device likely meant "5 cookies," process 100 can present a user interface that asks if the user meant to write "5 cookies." In some embodiments, a user interface that requests verification of identified individual answers can include identified answers for all questions of an assignment. Additionally, in some embodiments, a user interface can include any suitable user interface controls that can allow a user of the second user device to indicate that a detected answer was not correctly identified. For example, in some embodiments, such a user interface can include any suitable selectable input(s) that, when selected, can allow a user of the second user device to enter an updated answer using their finger, a stylus associated with the second user device, a keyboard associated with the second user device, and/or in any other suitable manner. Alternatively, in some embodiments, the user interface can include a selectable input that, when selected, can prompt a user of the second user device to re-upload an image of the completed assignment.

In some embodiments, block 112 of FIG. 1 can be skipped and any corrected, converted, and/or equivalent answers can be used without verification to determine whether the user of the second user device answered questions correctly.

At 114, process 100 can compare the verified individual answers with teacher-specified answers using the definition of the assignment received at 102. For example, in some embodiments, process 100 can determine whether each individual answer is correct by comparing each individual answer to a teacher-specified answer of a corresponding question. As a more particular example, in some embodiments, process 100 can determine whether each individual answer is correct by determining whether the individual answer matches a teacher-specified answer of a corresponding question. As another more particular example, in some embodiments, process 100 can determine whether each individual answer is correct by determining whether the individual answer is an acceptable equivalent to a teacher-specified answer of a corresponding question. As a specific example, in an instance where a teacher-specified answer to a particular question is "5 cookies," process 100 can determine that an individual answer of "5" is correct. Note that, in some embodiments, acceptable equivalents can be indicated in a definition of an assignment. For example, in some embodiments, a particular answer included in a definition of an assignment can include acceptable equivalent alternatives (e.g., "5 cookies," "5," "five," and/or any other suitable alternatives). As another example, in some embodiments, a definition of an assignment can include any suitable general acceptable equivalents, such as an indication that full sentence answers are not required, that spelling out numbers is acceptable, and/or any other suitable generalized rules.

As described above, when comparing answers of a user of a second device (e.g., a student) to the answers of a user of a first device (e.g., a teacher), it may be beneficial to correct or convert the answers of the user of the second device (e.g., the student). Additionally, or alternative, in some embodiments, the answers of the user of the first user device (e.g., the teacher) can be altered in to created corrected, converted, and/or equivalent answers. For example, if a teacher selected "5 cookies" as the correct answer, the mechanisms described herein can create "5 cookies" as an acceptable equivalent answer. Any suitable number of corrected, converted, and/or equivalent answers can be generated in some embodiments, and those corrected, converted, and/or equivalent answers can be generated at any suitable point in time. In some embodiments, an equivalent answer can be determined based on the text of a question being presented. For example, if a question asks "How many cookies do you have if you add 2 cookies to 3 cookies," and the teacher's answer says "5", the mechanisms described herein can create an equivalent answer of "5 cookies".

In some embodiments, the equivalent answers can be generated in advance of determining whether student answers are correct in order to speed of processing of all student answers.

Note that, in some embodiments, process 100 can assign partial credit to any individual answer in any suitable manner. For example, in some embodiments, in an instance where process 100 recognized intermediate steps of an answer prior to a final answer, and where process 100 determines that an intermediate step matches a teacher-specified intermediate step but that a final answer does not match a final teacher-specified answer, process 100 can determine that an individual answer is partially correct. In some such embodiments, process 100 can assign a score to an individual answer indicating that the individual answer is partially correct based on any suitable information, such as information specified in the definition of the assignment (e.g., information indicating that partial credit is allowed, information indicating that a particular intermediate step is worth 50% of the final score for the answer, and/or any other suitable information).

At 116, process 100 can assign a grade to the completed assignment based on the comparison of each individual answer to a corresponding teacher-specified answer. In some embodiments, process 100 can assign the grade using any suitable technique or combination of techniques. For example, in some embodiments, process 100 can calculate a percentage of correct answers in the completed assignment (e.g., 80% correct, 90% correct, and/or any other suitable percentage). As another example, in some embodiments, process 100 can convert a percentage of correct answers to a letter grade (e.g., "A," "A–," "B," C+," and/or any other suitable letter grade) using a look-up table and/or any other suitable technique(s).

Figure 4:
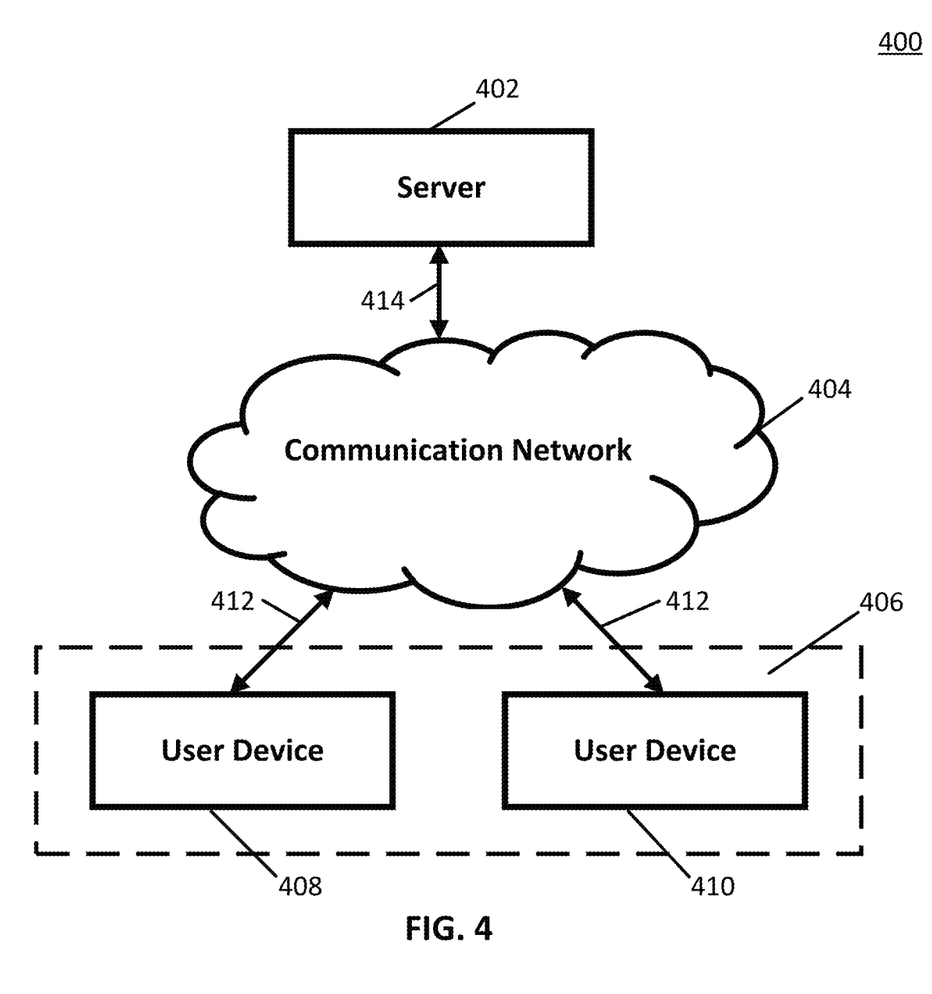
FIG. 4 shows a schematic diagram of an illustrative system suitable for implementation of mechanisms described herein for identifying and scoring assignment answers in accordance with some embodiments of the disclosed subject matter.

Turning to FIG. 4, an example 400 of hardware for identifying and scoring assignment answers that can be used in accordance with some embodiments of the disclosed subject matter is shown. As illustrated, hardware 400 can include a server 402, a communication network 404, and/or one or more user devices 406, such as user devices 408 and 410.

Server 402 can be any suitable server(s) for receiving and/or storing information, data, programs, and/or any other suitable content. For example, in some embodiments, server 402 can receive and/or store assignments received from a user device of a teacher. As another example, in some embodiments, server 402 can receive and/or store a completed assignment from a user device of a student. In some embodiments, data and/or programs stored on server 402 can be used to identify answers in a completed assignment received from a user device and to assign a grade to the completed assignment, as described above in more detail in connection with FIG. 1.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for generating and/or transmitting an assignment (e.g., a user device associated with a teacher, and/or any other suitable user device), one or more user devices suitable for transmitting a completed assignment and/or an image associated with a completed assignment (e.g., a user device associated with a student, and/or any other suitable user device), and/or any other suitable user device. For example, in some embodiments, user devices 406 can include a mobile phone, a tablet computer, a laptop computer, a desktop computer, a wearable computer, and/or any other suitable type of user device.

Although server 402 is illustrated as one device, the functions performed by server 402 can be performed using any suitable number of devices in some embodiments. For example, in some embodiments, multiple devices can be used to implement the functions performed by server 402.

Although two user devices 408 and 410 are shown in FIG. 4 to avoid over-complicating the figure, any suitable number of user devices, and/or any suitable types of user devices, can be used in some embodiments.

Server 402 and user devices 406 can be implemented using any suitable hardware in some embodiments. For example, in some embodiments, devices 402 and 406 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Figure 5:
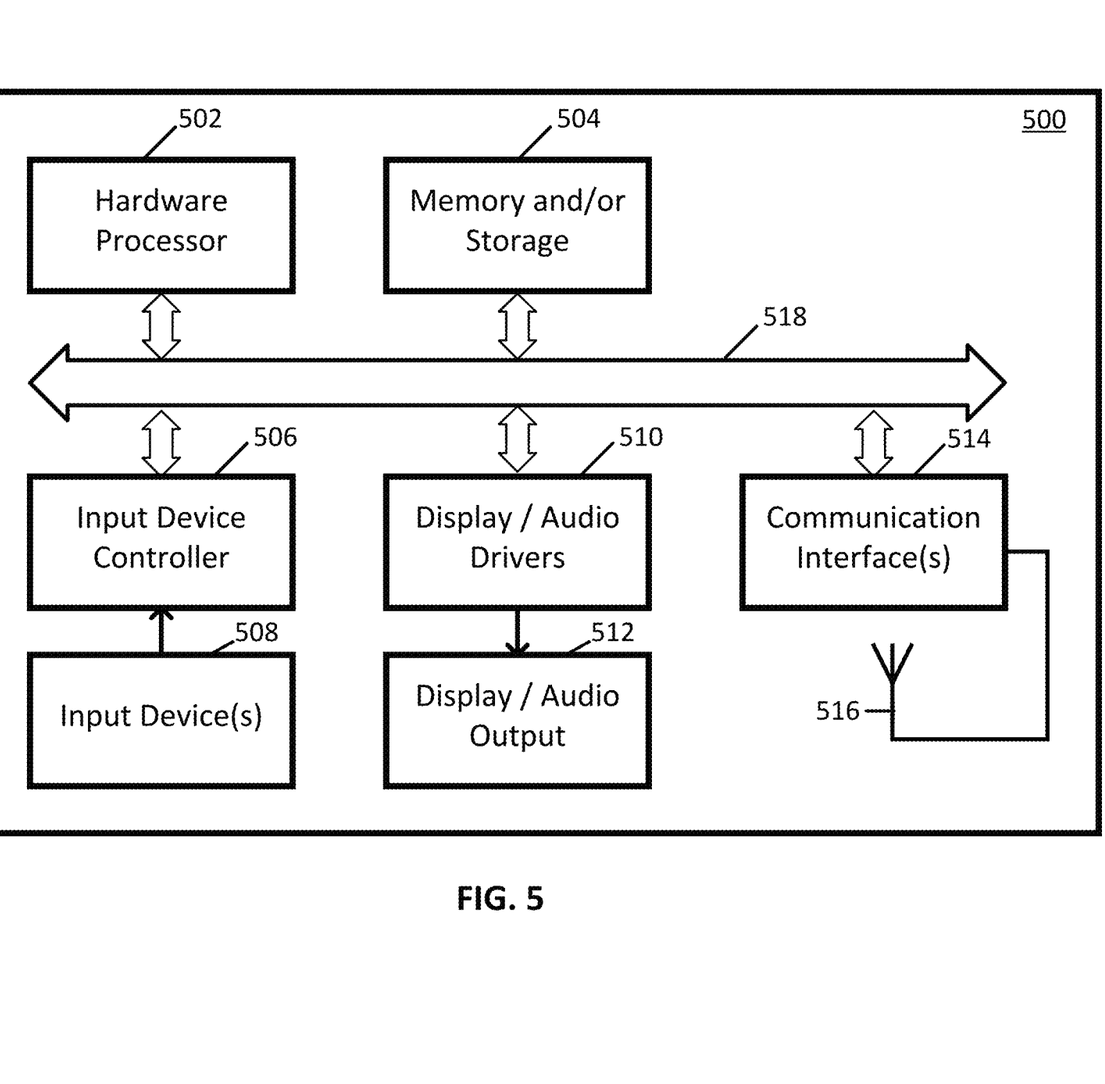
FIG. 5 shows a detailed example of hardware that can be used in a server and/or a user device of FIG. 4 in accordance with some embodiments of the disclosed subject matter.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 502 can be controlled by a server program stored in memory and/or storage of a server, such as server 502. For example, in some embodiments, the server program can cause hardware processor 502 to receive an image associated with a completed assignment from a user device associated with a student, identify answers of the completed assignment, assign a grade to the completed assignment based on the identified answers, and/or perform any other suitable functions. In some embodiments, hardware processor 502 can be controlled by a computer program stored in memory and/or storage 504 of user device 406. For example, in an instance where user device 406 is a user device associated with a teacher, hardware processor 502 can cause a template of an assignment and/or a definition of an assignment to be transmitted to server 402, as described above in connection with FIG. 1. As another example, in an instance where user device 406 is a user device associated with a student, hardware processor 502 can cause a completed assignment and/or an image associated with a completed assignment to be transmitted to server 402, as described above in connection with FIG. 1.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks (e.g., computer network 404). For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 416 can be omitted.

Bus 518 can be any suitable mechanism for communicating between two or more components 502, 504, 506, 510, and 514 in some embodiments.

Any other suitable components can be included in hardware 400 in accordance with some embodiments.

In some embodiments, at least some of the above described blocks of the process of FIG. 1 can be executed or performed in any order or sequence not limited to the order and sequence shown in and described in connection with the figure. Also, some of the above blocks of FIG. 1 can be executed or performed substantially simultaneously where appropriate or in parallel to reduce latency and processing times. Additionally or alternatively, some of the above described blocks of the process of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for identifying and scoring assignment answers are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for identifying and scoring assignment answers, comprising:
    a memory; and
    a hardware processor coupled to the memory and configured to:
        receive a definition of an assignment having a plurality of questions;
        identify correct answers to the questions;
        receive student answers to the questions for a student;
        create a converted answer for one of the student answers based on at least one of: spell-checking the one of the student answers; converting the one of the student answers based on a mathematical rule; converting the one of the student answers based on a mathematical property; converting a letter of the one of the student answers to a number; and normalizing the one of the student answers to use a particular notation;
        before determining whether the student answer is correct, present the converted answer to the student for verification;
        determine whether the student answer is correct by comparing the converted answer to a corresponding one of the correct answers; and
        determine a grade on the assignment for the student based on the comparing the converted answer to the corresponding one of the correct answers.

2. The system of claim 1, wherein the hardware processor is also configured to correct at least one of the student answers.

3. The system of claim 1, wherein the hardware processor is also configured to perform character recognition on an image to produce the student answers.

4. The system of claim 1, wherein the hardware processor is also configured to identify student answers based on a template of the assignment.

5. The system of claim 1, wherein the creating the converted answer is based at least on converting the one of the student answers based on a mathematical property, and wherein the mathematical property is one of a commutative property and a distributive property.

6. The system of claim 1, wherein the creating the converted answer is also based on a type of answer expected as the one of the student answers.

7. A method for identifying and scoring assignment answers, comprising:
    receiving a definition of an assignment having a plurality of questions;
    identifying correct answers to the questions;
    receiving student answers to the questions for a student;
    creating a converted answer for one of the student answers based on at least one of: spell-checking the one of the student answers; converting the one of the student answers based on a mathematical rule; converting the one of the student answers based on a mathematical property; converting a letter of the one of the student answers to a number; and normalizing the one of the student answers to use a particular notation, using a hardware processor;
    before determining whether the student answer is correct, presenting the converted answer to the student for verification;
    determining whether the student answer is correct by comparing the converted answer to a corresponding one of the correct answers using the hardware processor; and determining a grade on the assignment for the student based on the comparing the converted answer to the corresponding one of the correct answers.

8. The method of claim 7, further comprising correcting at least one of the student answers.

9. The method of claim 7, further comprising performing character recognition on an image to produce the student answers.

10. The method of claim 7, further comprising identifying student answers based on a template of the assignment.

11. The method of claim 7, wherein the creating the converted answer is based at least on converting the one of the student answers based on a mathematical property, and wherein the mathematical property is one of a commutative property and a distributive property.

12. The method of claim 7, wherein the creating the converted answer is also based on a type of answer expected as the one of the student answers.

13. A non-transitory computer-readable medium containing computer-executable instructions that, when executed by a processor, cause the processor to perform a method for identifying and scoring assignment answers, the method comprising:

receiving a definition of an assignment having a plurality of questions;

identifying correct answers to the questions;

receiving student answers to the questions for a student;

creating a converted answer for one of the student answers based on at least one of: spell-checking the one of the student answers; converting the one of the student answers based on a mathematical rule; converting the one of the student answers based on a mathematical property; converting a letter of the one of the student answers to a number; and normalizing the one of the student answers to use a particular notation;

before determining whether the student answer is correct, presenting the converted answer to the student for verification;

determining whether the student answer is correct by comparing the converted answer to a corresponding one of the correct answers; and determining a grade on the assignment for the student based on the comparing the converted answer to the corresponding one of the correct answers.

14. The non-transitory computer readable medium of claim 13, wherein the method further comprises correcting at least one of the student answers.

15. The non-transitory computer readable medium of claim 13, wherein the method further comprises performing character recognition on an image to produce the student answers.

16. The non-transitory computer readable medium of claim 13, wherein the method further comprises identifying student answers based on a template of the assignment.

17. The non-transitory computer readable medium of claim 13, wherein the creating the converted answer is based at least on converting the one of the student answers based on a mathematical property, and wherein the mathematical property is one of a commutative property and a distributive property.

18. The non-transitory computer-readable medium of claim 13, wherein the creating the converted answer is also based on a type of answer expected as the one of the student answers.

\* \* \* \* \*